Feb. 24, 1942.  J. M. BOYLE  2,273,829
VARIABLE DISCOUNT METERING SYSTEM FOR ELECTRIC PLANT USE
Filed Dec. 16, 1939  7 Sheets-Sheet 1
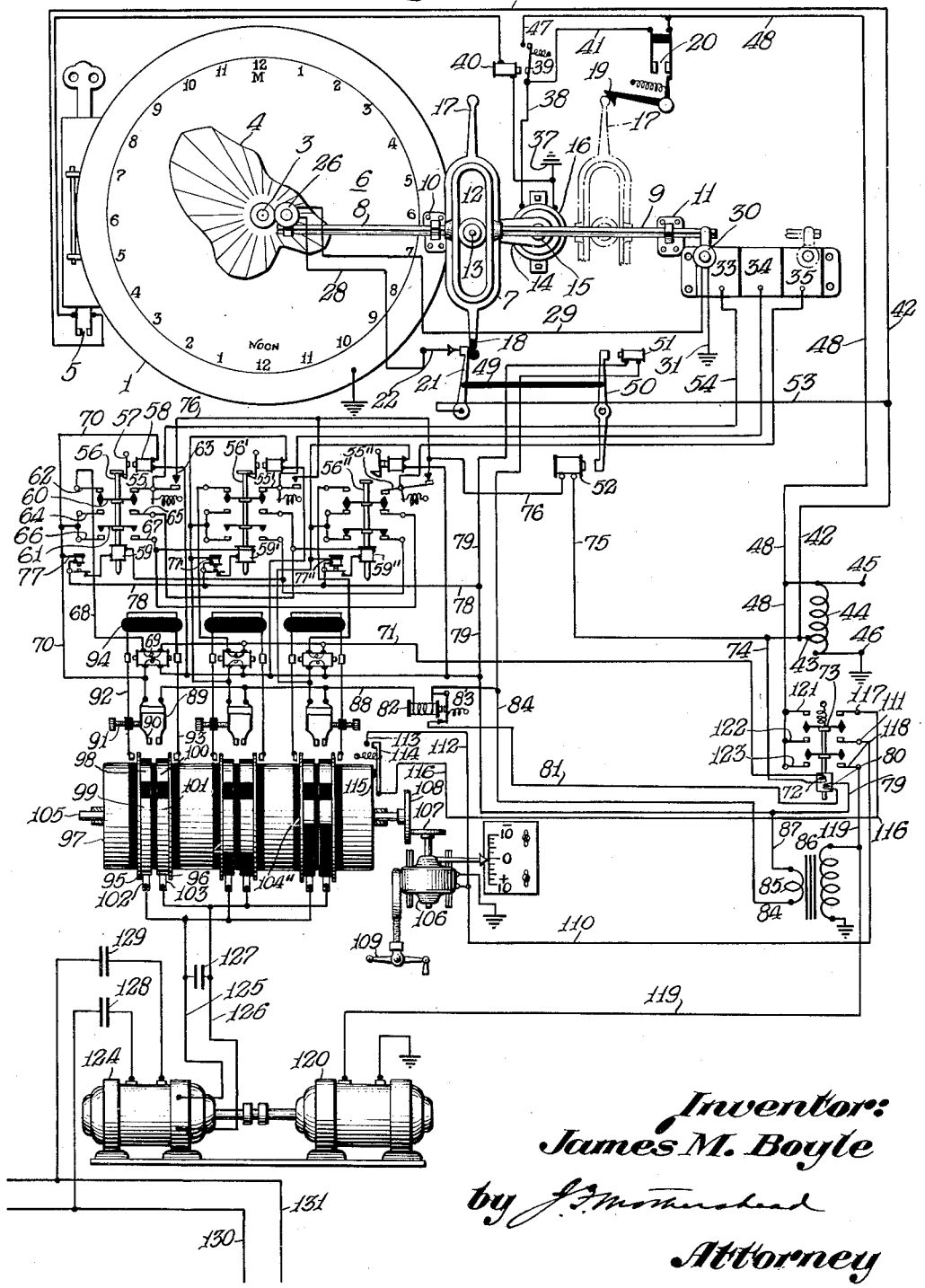
Inventor:
James M. Boyle
by
Attorney Inventor:
James M. Boyle,
by [signature]
Attorney.

Feb. 24, 1942.  J. M. BOYLE  2,273,829
VARIABLE DISCOUNT METERING SYSTEM FOR ELECTRIC PLANT USE
Filed Dec. 16, 1939  7 Sheets-Sheet 3

Inventor:
James M. Boyle,
by J. F. Mothershead
Attorney.

Feb. 24, 1942. J. M. BOYLE 2,273,829
VARIABLE DISCOUNT METERING SYSTEM FOR ELECTRIC PLANT USE
Filed Dec. 16, 1939  7 Sheets-Sheet 4
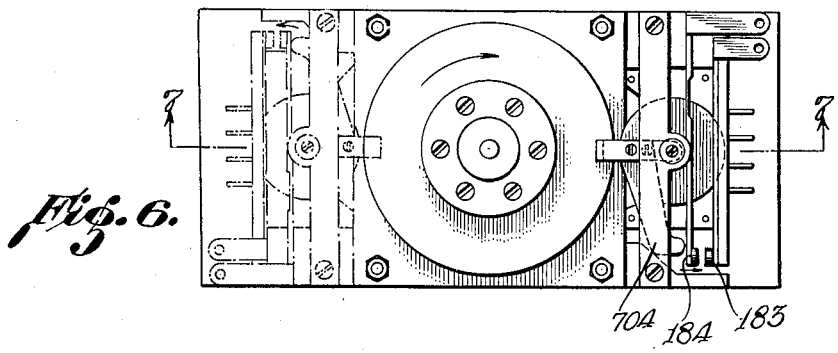
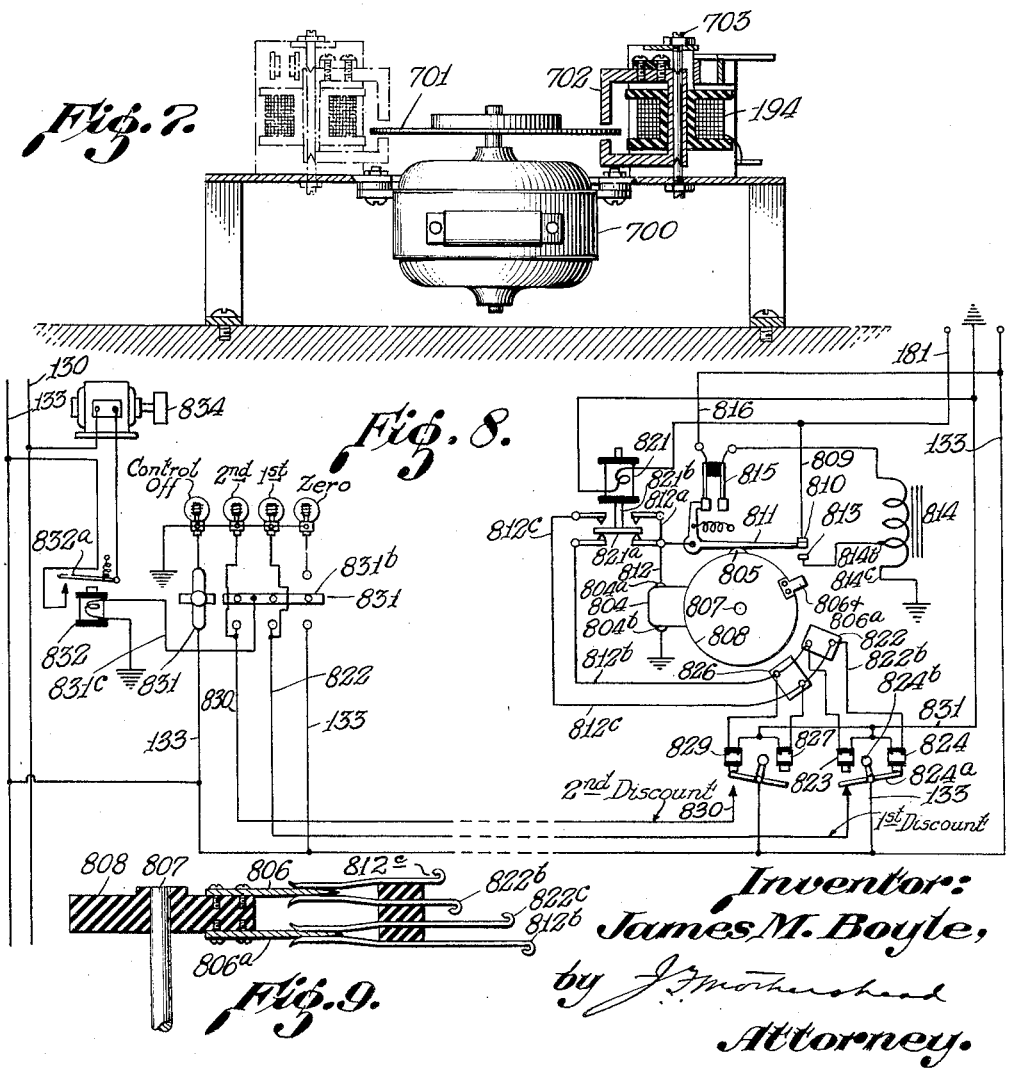

Feb. 24, 1942. J. M. BOYLE 2,273,829
VARIABLE DISCOUNT METERING SYSTEM FOR ELECTRIC PLANT USE
Filed Dec. 16, 1939 7 Sheets-Sheet 5
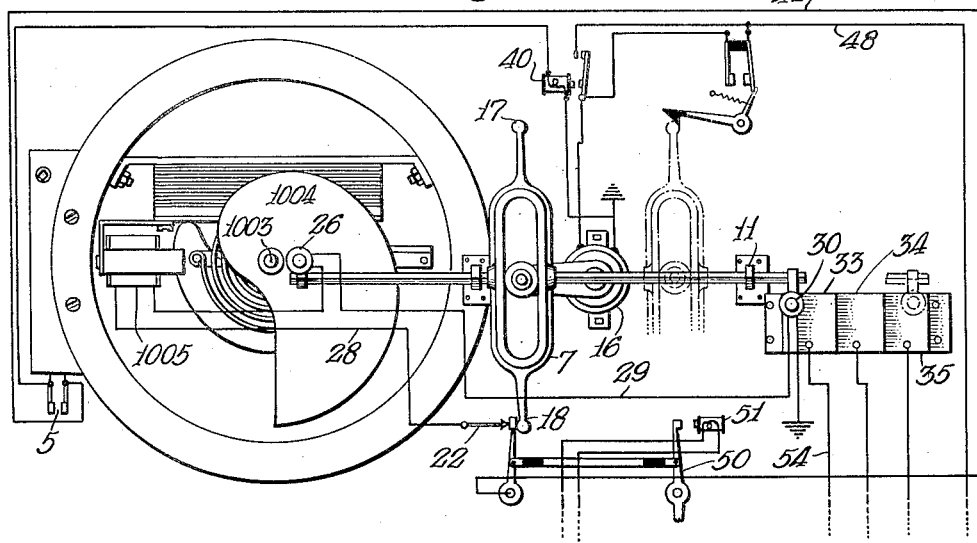
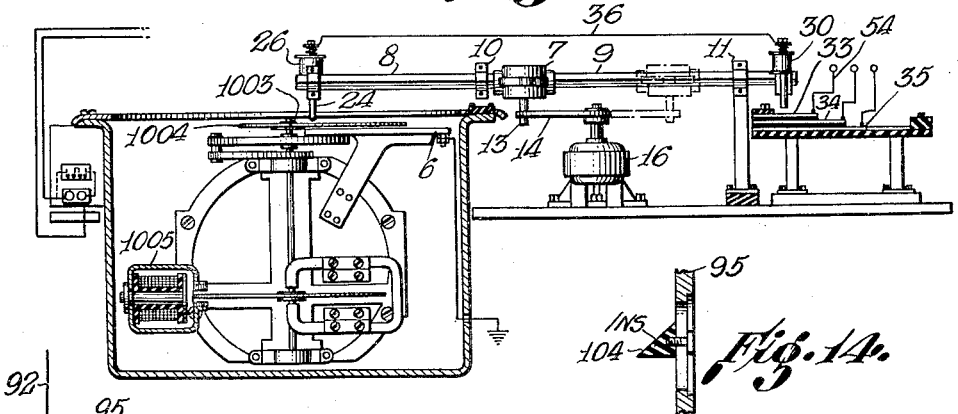
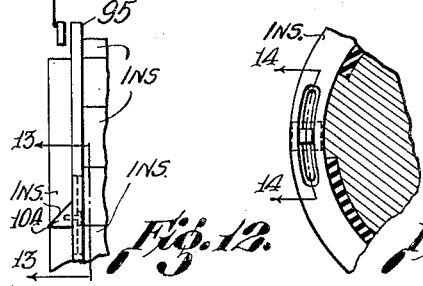
Inventor:
James M. Boyle,
by J. Muirhead
Attorney.

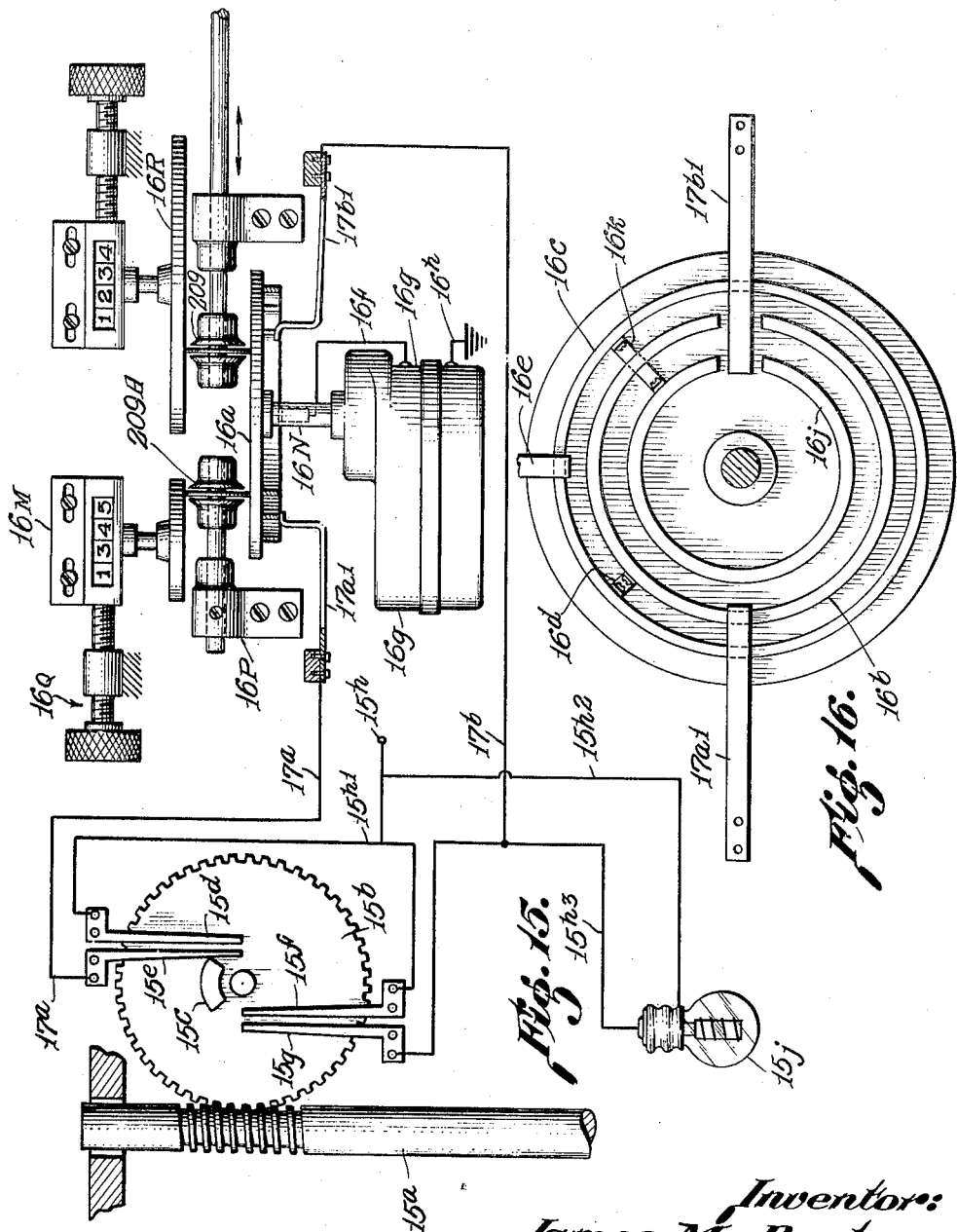

Patented Feb. 24, 1942

2,273,829

UNITED STATES PATENT OFFICE 2,273,829

VARIABLE DISCOUNT METERING SYSTEM FOR ELECTRIC PLANT USE

James M. Boyle, Darien, Conn.

Application December 16, 1939, Serial No. 309,589

25 Claims. (Cl. 171—97)

(Granted under the act of March 3, 1883, as amended April 30, 1928; 370 O. G. 757)

The invention described herein may be manufactured and used by or for the Government of the United States for governmental purposes without the payment to me of any royalty thereon (granted under the act of March 3, 1883, as amended April 30, 1928; 370 O. G. 757).

This invention relates to electrical power distribution, and more particularly, to methods and apparatus tending to distribute the demand for energy by cutting down on the demand for energy during the normal peak load periods and increasing the use of power during off-peak load periods, to thereby make possible the lowering of the unit energy charges as the average or combined consumer utilization of the total plant increases.

In electrical distribution systems as heretofore employed, electrical energy has been sold quite generally at a fixed rate schedule irrespective of whether a high or low demand was made upon the plant at any given time. In such a case the plant and distribution system is found frequently to be overloaded, and at other times to be loaded only slightly. This requires the provision of a much larger plant and distribution system than is economically desirable, for here the plant and distribution system must be of such size as to be capable of supplying the maximum demand although that demand may continue for only a short period each day and the plant may be running with little or no load at other times.

In order to provide more efficient use of plant and distribution facilities during off-peak load periods, clock mechanisms have been provided for switching on certain types of devices during historically determined off-peak load periods and for switching off these devices during historically determined peak load periods. In this type of system lesser charges have been made for the energy used by the devices operating only during off-peak periods. This type of system has been found impractical in certain respects due to the necessity of frequent checking and setting of the clock switching mechanism at the various subscribers' stations, and to the inability to predict future loads solely from the past history of the system.

In the practice of the present invention individual subscriber clock-controlled meters and switches are not required; the electricity used at a subscriber's station is metered by a conventional type of rotating shaft meter in which the shaft speed varies directly with the electricity passing through the meter, the rotating shaft being used either directly, or indirectly through establishing electrical contacts in the secondary pulsing circuit, to drive two counting dials; one to count the actual watt hours or ampere hours passing and the second one known as the discount dial which operates at a varying ratio so that during peak load periods a subscriber's discount meter meters the electricity used at the same rate as the conventional integrating meter. During such time as the plant and distribution system is operating to supply energy in varying quantities below that supplied during peak periods varying discount ratios are applied and the discount meter is then driven at a lesser speed than the conventional integrating meter dependent upon the particular discount ratio that it has been determined to apply during these various zones of discount periods. The discount ratio applied may be determined from the historical average of the energy or current supplied at a similar time of day or week or directly in accordance with the condition of the total load on the plant.

The varying discount ratios at which the subscriber's variable discount meters are to be driven with respect to the integrating (watt hour) meters having been determined from the load history of the system or from the existing load on the system as measured power or current, the equipment at the various subscriber stations is set remotely from any desired point in the distribution system by electrical impulses of a different frequency from the power frequency, superimposed on the distribution system proper or applied via auxiliary conductors such as telephone lines and the like, or via a radio channel. This discount ratio is set periodically as, for instance, every 15 or 30 minutes, or as frequently as it may be desired.

The equipment at the central station for controlling the discount ratios referred to above is referred to hereinafter as the load analyzer and energy discount transmitter, or pulser.

In addition to operating the discount meter at no discount in peak periods and at various predetermined discount rates below the peak load periods, the present invention contemplates methods and means, as subordinate functions of the meters, for selectively energizing various electric load devices automatically during such no-discount periods and such of the various discount periods as the consumer may desire. The equipment for switching on and off the off-peak loads are referred to hereinafter as the subscriber's off-peak load controllers.

The principal object of this invention is to provide means and methods for improving the load factor of an electrical distribution system and so to permit of lowering the unit electricity charges as the consumer-utilization of the plant increases.

Another object of this invention is to provide an electrical distribution system with supervisory apparatus for changing the drive ratio between the auxiliary counting dials of electrical consumer's meters from time to time and the usual total energy integrating meter thus making it possible to sell electricity at variable rates during historically established or periodically determined off-peak load periods, and so produce a resultant average low unit energy charge to the consumers.

Another object of the invention is to make possible the coincident increase of electrical energy supply system net income and the reduction of the average unit energy cost to consumers by increasing the average hour's use per day of the total plant through allowing consumers to use greater amounts of electricity per unit cost to them during lower and lower stages of daily plant use.

A further object of this invention is to provide an automatic signalling and switching device for indicating at consumer subscriber stations the particular discount that is being applied and for switching on and off various loads that are to be used only during predetermined no-discount or off-peak load discount periods.

Other and further objects of the invention will appear from the specification hereinafter following when read in connection with the accompanying drawings in which—

Fig. 1 is a diagrammatic representation of a load analyzer and energy discount ratio transmitter or pulser in which the discount ratio is controlled from the historically determined load.

Fig. 6 is a detail plan view of the dynamic relay included in the consumer subscriber's meter station shown in Fig. 1a.

Fig. 7 is an elevational view partially in section of a dynamic relay shown in Fig. 6.

Fig. 8 is a schematic view of that part of the present invention hereinafter referred to as a consumer's off-peak load controller. This mechanism is an adjunct to the discount meters of Fig. 2 and its purpose is to automatically limit the use of heavy load consuming devices on the consumer's premises to such discount rate periods as the consumer may determine from time to time.

Fig. 9 is a detail sectional view of a part of the selective circuit opening and closing mechanism shown in Fig. 8.

Fig. 10 is a diagrammatic representation of a second embodiment of the load analyzer and discount determinator of this invention and differs from that constituting the upper portion of Fig. 1 in that in Fig. 10 the discount ratio to be applied is determined from the then present load on the system as indicated by a watt meter or an ampere meter and not to the predicted load as determined from past history.

Fig. 11 is an elevational view partially in section of the depicted determinator shown diagrammatically and in plan in Fig. 10.

Fig. 12 is an enlarged detail view of one of the adjustable wedges carried on the pulsing cylinder shown in Fig. 1.

Fig. 13 is a detail sectional view on line 13—13 of Fig. 12 of a part of the pulsing cylinder showing the slot along which the wedge member may be adjusted.

Fig. 14 is a further detail sectional view of the pulser cylinder wedge arrangement made on line 14—14 of Fig. 13.

Fig. 15 is a diagrammatic representation of another embodiment of the discount meter actuating mechanism.

Fig. 16 is a plan view of the circuit opening and closing arrangement associated with the cycling motor shown in Fig. 15.

Figure 17:
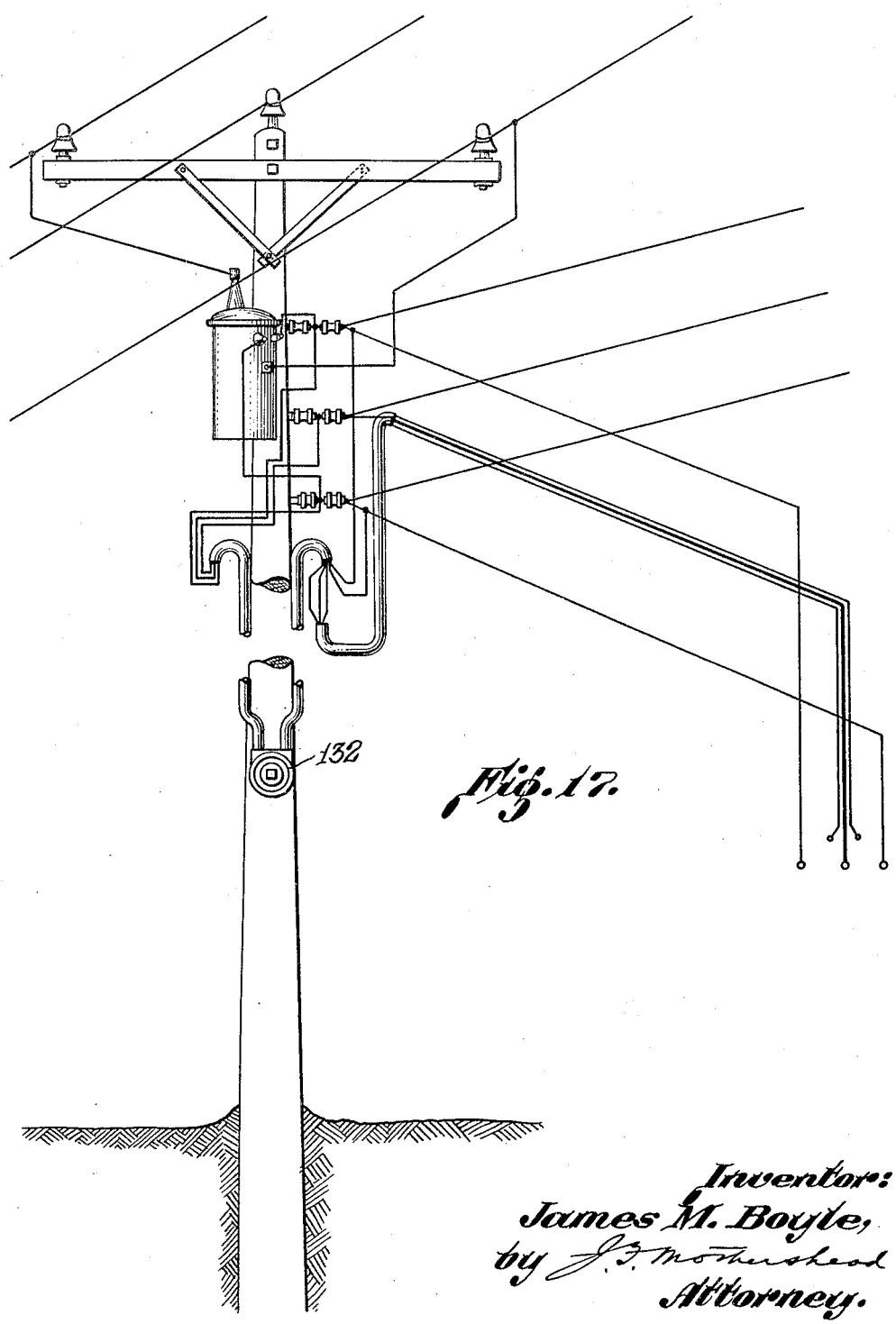

Fig. 17 is a perspective view partially in section showing an embodiment of the metering arrangement wherein the electric meter proper is located on a power line pole and in which the counting dials are remotely located with respect thereto.

In the drawings 1 is a clock case provided with clock mechanism 2 (see Fig. 3) adapted to drive the shaft 3 one revolution each twenty-four hours. The shaft 3 is adapted to have fastened thereto for rotation therewith a cut-out chart 4 of paper or other non-conducting material the radii of which represent varying historically established loads for the time periods corresponding to the various radii. As the clock mechanism 2 turns the shaft 3 the chart 4 is turned therewith one revolution in twenty-four hours. The clock mechanism 2 within the case 1 is arranged to close the contacts 5 for a short period of time repeatedly every 15, 20 or 30 minutes for example. Above the metal platen 6 of the clock mechanism there is mounted a movable slide rod and yoke mechanism including the yoke 7 and projecting slide rods 8 and 9 slidably mounted in bearings 10 and 11, respectively. Extending through the slot or opening 12 of the yoke 7 is a roller 13 mounted on the crank arm 14 which turns with the shaft 15 of motor 16.

Figure 3:
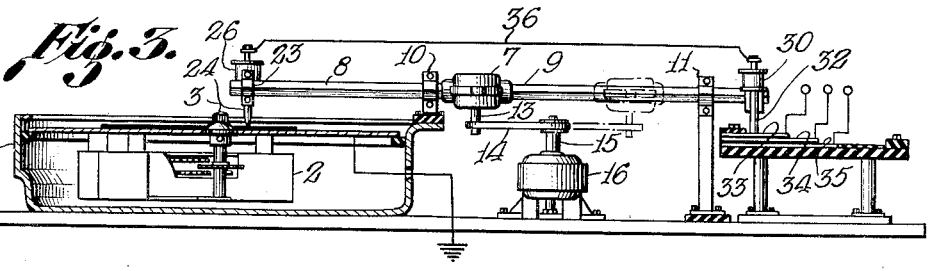
Fig. 3 is a detail sectional view of the load analyzer depicted in Fig. 1 in which the discount ratio is determined historically.
Figure 4:
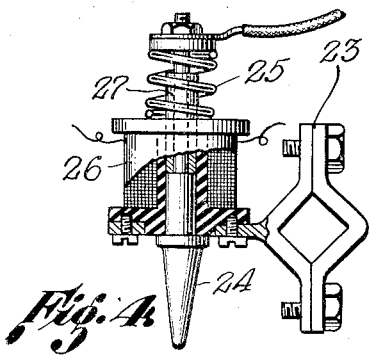
Fig. 4 is a detail view partially in section of the solenoid actuating sensing contactor of the load analyzer depicted in Figs. 1 and 3.

The yoke 7 and slide rods 8 and 9 are moved reciprocally when the motor 16 and crank 14 are turned. Fingers 17 and 18 are mounted on opposite ends of the yoke 7. The finger 17 is adapted to contact with the bell crank lever 19, opening contacts 20 when the yoke 7 is in the extreme right-hand or dotted line position. The finger 18 is adapted to close the contact arm 21 against the fixed contact member 22 when the yoke 7 is in the extreme left or solid line position. Mounted on the left of the slide rod 8 is a sensing finger assembly 23 (see Figs. 3 and 4). The sensing finger assembly is adapted to be clamped to the slide rod 8 as shown in Fig. 3. The sensing finger assembly includes a sensing finger or stylus 24 (Fig. 4) normally held in an upward position by the spring 25. The sensing finger or stylus 24 is mounted for reciprocal motion within the solenoid winding 26 which, when energized, pulls the magnetic member 27 and the sensing finger 24 attached thereto downward. One end of the solenoid winding 26 is connected by the conductor 28 to the fixed contact 22. The other end of the solenoid winding 26 is connected by the conductor 29 to one end of the winding of another solenoid 30, the other end of the winding of which is connected to ground at 31. The solenoid 30 constitutes a part of an assembly identical to the sensing finger assembly 23 (Fig. 4). The solenoid 30 when energized pulls down the zone plate contacting finger 32 to bring it into contact with one of the adjustable zone plates 33, 34 or 35. The sensing finger 24 for contacting the chart 4 or the metal platen 6 is connected by conductor 36 (see Fig. 3) to the zone plate contacting finger 32.

The motor 16 has one terminal thereof connected to ground at 37, while the other terminal thereof is connected by conductor 38 to the contact arm 39 of relay 40 and to one of the contacts 20 via conductor 41. The relay 40 is connected in circuit between the ground connection 37 of motor 16 and to one of the contacts 5. The other contact 5 is connected via conductor 42 to low voltage tap 43 on auto transformer 44 connected to a source of A. C. potential at terminals 45 and 46. The fixed contact 47 of relay 40 is connected by means of conductor 48 to one of the contacts 20 and to the terminal 45.

The contact arm 21 is mechanically connected by means of the link mechanism 49 to the pivoted double armature 50 associated with electromagnets 51 and 52. This contact arm 21 is electrically connected via conductor 53 to the conductor 42. The zone plate 33 is connected via conductor 54 to the pivoted double contact arm 55 associated with the switch shaft 56. The switch shaft 56 is adapted to be latched in its upward position by the spring locking armature 57 which may be unlatched by the energization of electromagnet 58. The switch shaft 56 is urged upward by solenoid 59 when this solenoid is energized. The switch shaft 56 is provided with an upper set of contact fingers 61. The set of contact fingers 60 are adapted in their upper position to complete a circuit between fixed contact 62 and the pivoted contact 55, opening the circuit between pivoted contact 55 and fixed contact 63. In the lower position of switch shaft 56 the contact fingers 60 close a circuit between the fixed contacts 64 and 65 while at this same time the contact fingers 61 close a circuit between fixed contacts 66 and 67.

The solenoid 59 has one end thereof connected to the back contact of relay 77 while the other end thereof is connected to the fixed contacts associated with switch shafts 56' and 56" corresponding to fixed contact 61 of switch shaft 56. The fixed contact 65 associated with switch shaft 56 is connected to the fixed contact associated with switch shaft 56' corresponding to contact 65 and also to one end of the solenoid associated with switch shaft 56' corresponding to solenoid 59. The fixed contact 62 associated with switch shaft 56 is connected via conductor 68 to one end of the upper winding of electromagnet 69. One terminal of the electromagnet 58 is connected via conductor 70 to one terminal of the lower winding of electromagnet 69. The other end of the top winding of the double winding electromagnet 69 incidental to and shown beneath the switch shaft 56 and the similar end terminals of the doubly wound relays incidental to the switch shafts 56' and 56" are connected by conductor 71 to one of the terminals of the upper solenoid winding 72 for actuating switch shaft 73. The other terminal of the solenoid winding 72 is connected by conductor 74 to the auto transformer tap 43. One terminal of the electromagnet 52 is connected via conductor 75 to the auto transformer 43. The other terminal of the electromagnet 52 is connected via the conductor 76 to the contact 63 associated with the double ended rocking contact 55 incidental to the switch shaft unit 56 and to other contacts similar thereto associated with switch shafts 56' and 56". The relay 77 has one terminal connected to conductor 70 and the other terminal thereof and the armature contact is connected to conductor 78 as are the relays similar to relay 77 incidental to switch shaft 56' and 56". The conductor 78 is connected via conductor 79 to one terminal of the lower solenoid winding 80 associated with switch shaft 73. The other terminal of the solenoid 80 is connected via conductor 81 to the fixed contact of relay 82.

The relay 82 has one of its terminal windings and its armature contact connected by conductor 83 to the conductor 84 to the lower terminal of the secondary 85 of transformer 86. The upper terminal of the transformer secondary 85 is connected via conductor 87 to conductor 79. The other terminal of the relay 82 is connected via conductor 88 to the fixed contact 89 incidental to switch shaft 56 and to the other fixed contacts similar thereto incidental to switch shafts 56' and 56".

Opposite to the fixed contact 89 is a movable spring contact 90 adapted to be actuated by the adjustable screw 91 insulatingly carried by the armature 92 associated with the electromagnet 69. The spring contact 90 is connected to that one of the terminal windings of electromagnet 69 connected to conductor 70. The electromagnet 69 is provided with a second armature 93. The armatures 92 and 93 associated with electromagnet 69 are mounted on an insulating support 94 and are connected together. Fixed contacts 64 and 66 associated with switch shaft 56 are connected to conductor 70.

The ends of the armature 92 and 93 associated with electromagnet 69 bear upon the slip rings 95 and 96, respectively, carried on rotatable pulsing drum 97. The slip ring 95 is electrically connected to commutator segments 98 and 99 while the slip ring 96 is connected to commutator segments 100 and 101. The commutator segments 98 and 99 are associated with brush 102 while segments 100 and 101 are associated with brush 103. There is mounted on the slip ring 95 a wedge shaped insulating segment 104 (see detail Figs. 12, 13 and 14) for engagement with the end of the armature 92. The insulating wedge 104 is adapted to be adjusted to a predetermined desired position arcuately of the slip ring 95 to lift the armature 92 to open a circuit between contacts 89 and 90 when the wedge 104 comes against the end of electromagnet armature 92. By adjusting the position of the wedge 104 the length of time that a circuit is completed between brush 102 and 103 may be regulated. Additional sets of slip rings, commutator segments and brushes similar to 95, 96, 98, 99, 100, 101, 102, and 103, are associated with the switch shaft units 56' and 56''. These additional slip ring and commutator arrangements are mounted on pulsing drum 97.

The pulsing drum 97 is mounted on a shaft 105 which is driven by motor 106 through the intermediary of the variable ration driving mechanism constituted by friction wheel 107 mounted on the shaft of the motor 106 engaging with the friction disc 108 mounted on the shaft 105 of the pulsing drum. In the drawings the commutator segments 99, 101 and the other segments similar thereto are shown as being of different lengths to send different length pulses. It is obvious, however, that the time of closure of the circuit between brushes 102, 103 and other similar brushes may be varied by varying the length of the commutator segments or by varying the position of the wedge 104. Also the time the brushes 102 and 103 are effectively connected together may be adjusted by varying the position of the friction wheel 107 with respect to the disc 108. This can be conveniently done by moving the pulsing drum driving motor 106 and its friction wheel 107 with respect to the friction disc 108 by rotation of the worm fed control 109. The motor 106 has one of its terminals connected to ground and the other terminal is connected by means of the conductor 110 to the fixed contact 111 associated with switch shaft 73. The ungrounded terminal of the motor 106 is also connected via conductor 112 to the fixed contact 113 associated with the movable contact arm 114 which is maintained out of contact with fixed contact 113 by the cam projection 115 mounted on the pulsing drum 97. The contact arm 114 is connected via conductor 116 to the fixed contact 117 associated with switch shaft 73. The contact 118 associated with switch shaft 73 is connected via conductor 119 to one terminal of the primary of transformer 86 the other terminal of which is grounded. Conductor 119 also connects the contact 118 with one terminal of the motor 120 the other terminal of which is grounded. The fixed contacts 121, 122, and 123 associated with switch shaft 73 are connected via conductor 48 to a source of A. C. potential 45. The motor 120 is connected to drive an A. C. generator 124 for generating a pulsing frequency differing from the frequency of the power system to which it is connected, for instance 720 cycles or 3600 cycles or the like. This A. C. generator 124 is of the self excited type and its field winding is fully closed only when a circuit is completed between conductors 125 and 126 connected to brushes 102 and 103, respectively, associated with switch shaft 56 and the other similar brushes associated with switch shafts 56' and 56''. The condenser 127 is connected across conductors 125 and 126 to prevent arcing at the brush and commutator segment contacts when these circuits are opened. The output of the A. C. generator 124 is fed via condensers 128 and 129 to the conductors 130 and 131, respectively, supplying current from a source of A. C. of 60 cycles for instance, to a group of consumers via conductors 130 and 131.

Figure 1A:
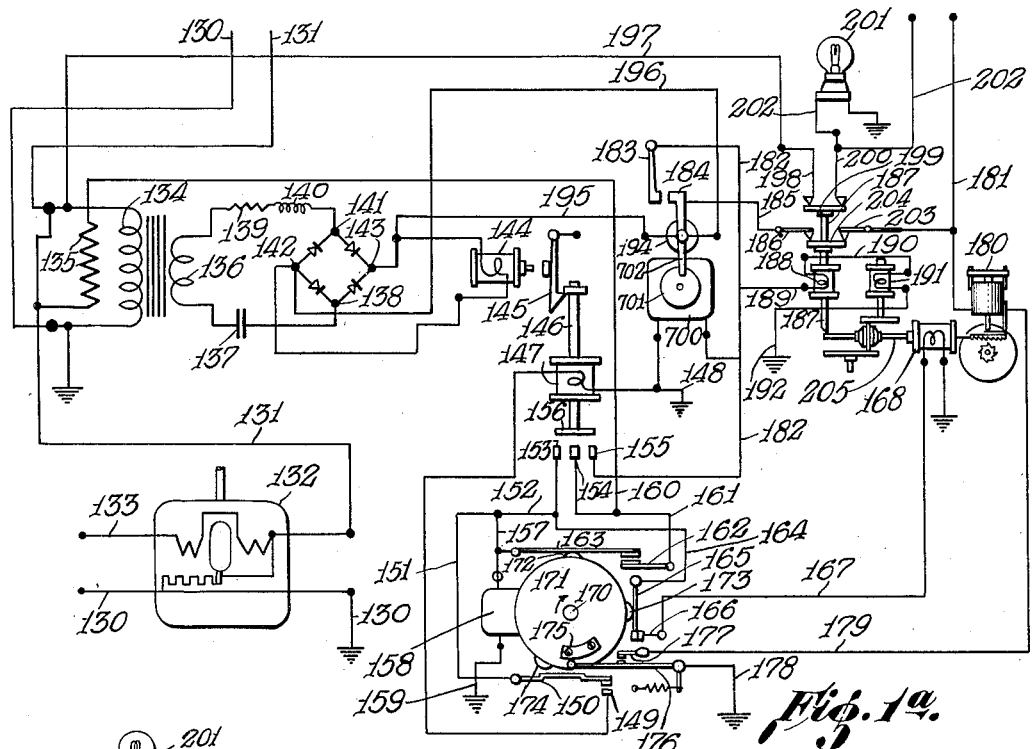
Fig. 1a is a diagrammatic representation of that part of the present invention located at a consumer's subscriber's meter station showing one embodiment of the invention employing a dynamic relay control circuit.

In Fig. 1a, the conductors 130 and 131 leading from the power plant supply power through the watt-hour meter 132 to the consumer's load, at conductors 130 and 133. The incoming conductors 130 and 131 are connected to the primary 134 of a transformer. Associated with the primary 134 is a secondary 136, one end of which is connected via condenser 137 to a point 138 on a bridge rectifier. The other terminal of the secondary 136 is connected via the resistance 139 and inductance 140 to the point 141 on the bridge rectifier opposite to the point 138. The intermediate points of the bridge rectifier 142 and 143, respectively, are connected to an unlatching electromagnet 144 having an armature latch 145 associated with a solenoid switch shaft 146. The solenoid shaft 146 passes through a solenoid winding 147 one end of which is connected to ground at 148, and the other end of which is connected to contact 149, associated with contact arm 150, which is connected via conductor 151 and 152 to the fixed contact 153. Adjacent to contact 153 are located two additional fixed contacts 154 and 155 all of which are adapted to be connected together by the movable contact 156 mounted on the solenoid switch shaft 146. The fixed contact 153 is connected via conductor 152 and 157 to one terminal of the cycling motor 158, the other terminal of which is grounded at 159. The fixed contact 154 is connected via conductor 160 to the autotransformer tap 135. Fixed contact 154 is also connected via conductor 161 to fixed contact 162 associated with movable contact arm 163 connected to conductor 157. The fixed contact 153 is also connected via conductor 164 to the movable contact arm 165 associated with fixed contact 166. The fixed contact 166 is connected via conductor 167 to one terminal of the winding of resetting solenoid 168, the other terminal of which is connected to ground at 169. The motor 158 drives shaft 170 carrying disc 171. The disc 171 has mounted thereon cam projections 172, 173 and 174. The cam projection 172 is adapted to cooperate only with the switch arm 163 to lift this arm when the disc 171 is in the normal or stop position shown. The cam projection 173 is associated only with switch arm 165 and closes this contact against fixed contact 166 only during the period beginning immediately after the cam disc 171 begins rotating. The cam projection 174 associated with switch arm 150 closes this arm against fixed contact 149 only during the latter part of a cycle of rotation of the cam disc 171. The projection 175 mounted on cam disc 171 actuates contact arm 176 to hold it out of contact with fixed contact 177 until the disc 171 has started its cycle of rotation. The switch arm 176 is connected to ground at 178 and the fixed contact 177 is connected via conductor 179 to one terminal of the thruster actuating solenoid 180. The other terminal of solenoid 180 is connected to conductor 181. The back contact 155 is connected via conductor 182 to one terminal of the motor 183 of the dynamic relay. The other terminal of the motor 183 is connected to ground at 148. Conductor 182 also connects back contact 155 with the contact 183 of the dynamic relay, which cooperates with moving contact 184. The moving contact 184 of the dynamic relay is connected via conductor 185 to the fixed contact 186 carried by solenoid actuated shaft 187 actuated by solenoid 188. One terminal of the winding of solenoid 188 is connected by conductor 189 to conductor 182. The other terminal of the solenoid 188 is connected via conductor 190 to one terminal of the winding of solenoid 191, the other terminal of which is connected to ground at 192.

Figure 5:
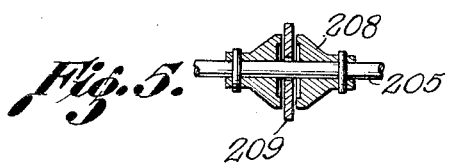
Fig. 5 is a detail sectional view of the variable ratio motion transfer device including the wheel 201 of a subscriber consumer's meter station such as that depicted in Figs. 1a, 1b and 2.

The magnetizing winding 194 of the dynamic relay is connected via conductors 195 and 196 to the points 143 and 142, respectively, on the bridge rectifier. The conductor 197 connects conductor 131 with the contact 198. Contact 198 is adapted to be connected via bridging contact 199 to contact 200 when the solenoid shaft 187 is in the upward position. The fixed contact 200 is connected to signal lamp 201 via the conductor 202. The fixed contact 186 is adapted to be connected with the fixed contact 203 connected to conductor 181 when the movable contact 204, carried by shaft 187 is in its upward position. The switch shaft 187 is retained in its upward position so long as the shaft 205 extends under the lower end thereof. The shaft 205 is slidably mounted in bearings 206. The shaft 205 is provided with stop members 207 for limiting the longitudinal movement thereof, and guides 208 pinned thereto (see Fig. 5) for holding friction wheel 209 in a plane normal to the axis of the shaft and freely rotatable thereabout. The friction wheel 209 normally engages the friction discs 210 and 211. The friction disc 210 is carried on the shaft 212 from which the watt-hour meter counting dials 213 are controlled. The friction disc 211 is mounted on a shaft 214 driving the discount meter dials 215. To one end of the shaft 205 is attached the solenoid actuated core 216 associated with solenoid winding 168. The shaft 205 is coupled by means of the link member 217 to the thruster rack member 218. The thruster rack member 218 normally occupies the position shown, being held in an upward position by the spring 219. The spring 219 is attached to the solenoid plunger shaft 200 which has a plunger 221 attached thereto. The spring 219 is also attached to supporting member 222 carried on the solenoid. When the solenoid winding 180 is energized the solenoid core 221 is pulled downwardly whereupon the rod 220 shoves against spring 219 and thruster rack 218 to bring this rack into mesh with the spur gear 223 mounted on shaft 170 of the motor 158.

Figure 1B:
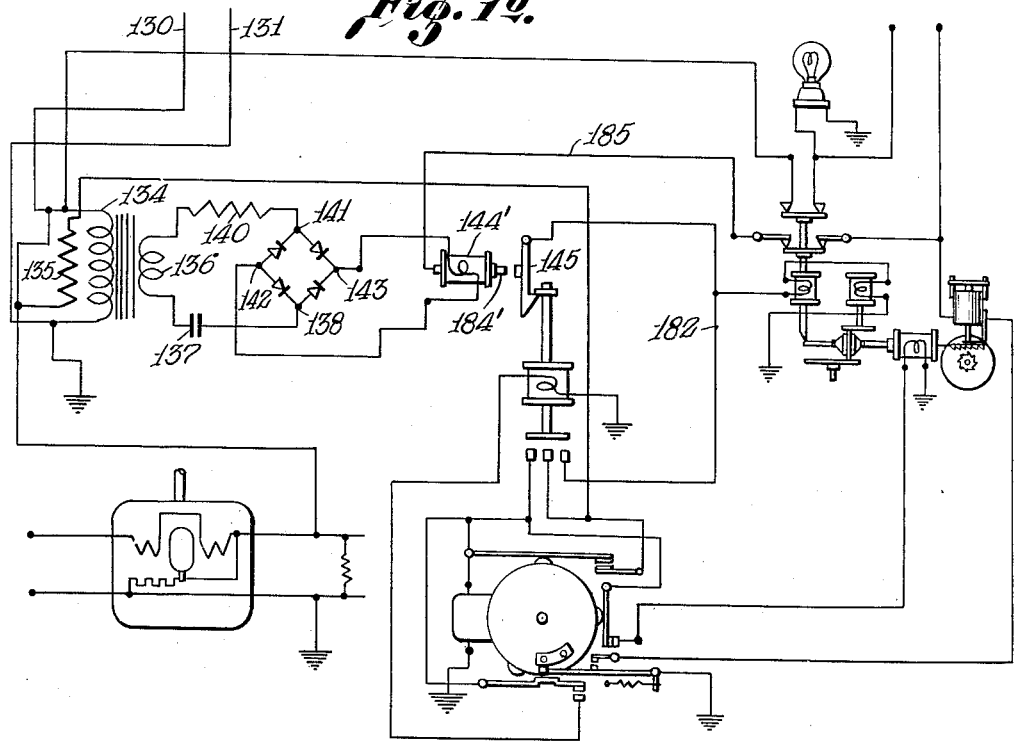
Fig. 1b is a diagrammatic representation of that part of the present invention located at a consumer's subscriber's meter station showing another embodiment employing a different type of relay control circuit.

The consumer's discount meter arrangement shown in Fig. 1b is similar to that described in connection with Figs. 1a and 2, with the exception that the electromagnet 144 in Fig. 1a is replaced by an electromagnet and relay 144'. Electromagnet relay 144' is provided with a fixed contact 184' cooperating with a movable contact mounted on the latching armature 145. The fixed contact 184' is connected to conductor 185, and the armature contact on latch 145 is connected to conductor 182. It is thus apparent that when a circuit is closed between contacts 184' and 145 the dynamic relay described in connection with Fig. 1a may be eliminated and its functions performed by relay electromagnet 144'. The remainder of Fig. 1b is substantially that of Fig. 1a and Fig. 2 heretofore described.

The dynamic relay, the circuits of which are shown in Fig. 1a, is set forth in detail in Figs. 6 and 7, in which 700 is an electric motor or other form of prime mover having an electrically conductive disc 701 mounted on its shaft and adapted to be driven thereby. Cooperating with the revolving disc 701 is a C-shaped para-magnetic body 702 pivoted on shaft 703 and having the magnetizing coil 194 mounted to surround that section of the core near the pivotal axis thereof. The open end of the C-shaped para-magnetic core encompasses a part of the disc 701 so that when the disc 701 is rotated with coil 194 carrying a current, the C-shaped magnetic body is magnetized tending to slow down the rotation of the disc 701 or to carry the magnetic member along with the disc 701. Inasmuch as the member 702 can not move except about its pivotal axis 703 it is seen that this member is caused to rotate about its axis closing a circuit between contacts 183 and 184 by means of the projection 704 carried thereby.

In Fig. 8 the conductor 181 is connected to and corresponds to the conductor 181 shown in Fig. 1a or 1b, while conductor 133 is connected to and corresponds to conductor 133 of Fig. 1a or Fig. 1b. The conductor 133 is adapted to be connected by the switch 832a to a current consuming device 834 such as a deep well pump motor or hot water heater or the like and to other similar devices. Conductor 133 is also connected by auxiliary conductor 816 to one of the contacts of switch 815 the other of which is connected to energize the auto transformer 814 when switch 815 is closed. The auto transformer 814 is provided with a low voltage tap 814b connected to the switch contact 813. The conductor 181 is connected by means of auxiliary conductor 809 to the switch contact 810. The switch arm 811 is adapted to make contact with either switch contact 810 or contact 813. The arm 811 is controlled in its position by the cam projection 805 mounted on cycling disc 808 carried by shaft 807 on motor 804. The terminals of motor 804 are connected to ground at 804b and to terminal 812 which in turn is connected to the switch arm 811 and to front and back contacts associated with solenoid actuated switch plunger 821a. The solenoid winding 821 connected between conductor 181 and ground is energized at such times as a potential is applied to conductor 181. The solenoid switch plunger 821a is also provided with additional front and back contacts connected respectively to conductors 812b and 812c. These conductors are connected, respectively, to sets of contacts 822 and 826 (see Fig. 9) associated with contacts 822b and 822c, and tongues 806 and 806a, carried on disc 808. The contacts 822b and 822c of one set are connected, respectively, to one end of the windings of a pair of electromagnets 824 and 823. The other end of the windings of the electromagnets 823 and 824 are connected to ground via conductor 831.

The contacts 826 of another set of contacts similar to contacts 822 associated with the tongues 806 and 806a are connected, respectively, to one end of the windings of a pair of electromagnets 827 and 829. The other end of the windings of electromagnets 827 and 829 are connected to ground via conductor 831. Each pair of the relays 823—824, etc., are provided with a relay armature. These armatures are so arranged as to be magnetically attractive by either one of the electromagnets associated therewith when energized, and to remain in the attractive position until the other electromagnet of the pair subsequently becomes energized. The armatures associated with all of the pairs of electromagnets are connected to conductor 133. The armature 824a when in the position shown bears against a contact connected to conductor 822 placing a potential thereon from conductor 133. The armature 827a when moved to the position opposite to that shown bears against a contact connected to conductor 830 placing a potential thereon from conductor 133.

Conductors 133, 822 and 830 are connected to patching jacks or switches 831. The opposite terminals of the jacks or switches are connected to signal lamps. The signal lamps associated with the respective conductors 133, 822 and 830 may be selectively connected to these conductors by the patching plug or switch 831a. When the plug 831a is inserted in either of the jacks incidental to the zero or first or second discount position the electromagnet 832 connected to the middle terminal of these jacks is then connected to one of said conductors and will be energized provided there is a potential thereon. The electromagnet 832 when energized closes a switch 832a connecting the conductors 130 and 133 to a current consuming device 834 such as a deep well pump motor, air conditioner motor, water heater, or the like.

The load analyser mechanism shown in Figs. 10 and 11 is similar to that shown in Fig. 1, with the exception that here the clock 2 is used only to close the circuit at contacts 5 to initiate a cycle of operation periodically. No clock driven load chart is employed. But instead, a wattmeter or ammeter metering the entire power or current output from the system is used to turn instead a plate member having the form generally of an Archimedean spiral. The spiral plate is shown at 1004. This spiral is carried on the shaft 1003 of a conventional watt-meter or ammeter and it is so arranged that the greater the load on the plant the greater will be the radial distance from the center thereof to the point to which the sensing finger 24 contacts with the metal platen therebeneath. A locking electromagnet 1005 connected in series with solenoid 26 is provided for the purpose of locking the meter shaft 1003 at such times as the spiral plate is being sensed. In other respects the device shown in Figs. 10 and 11 is substantially the same as that described heretofore in connection with Fig. 1.

Figure 2:
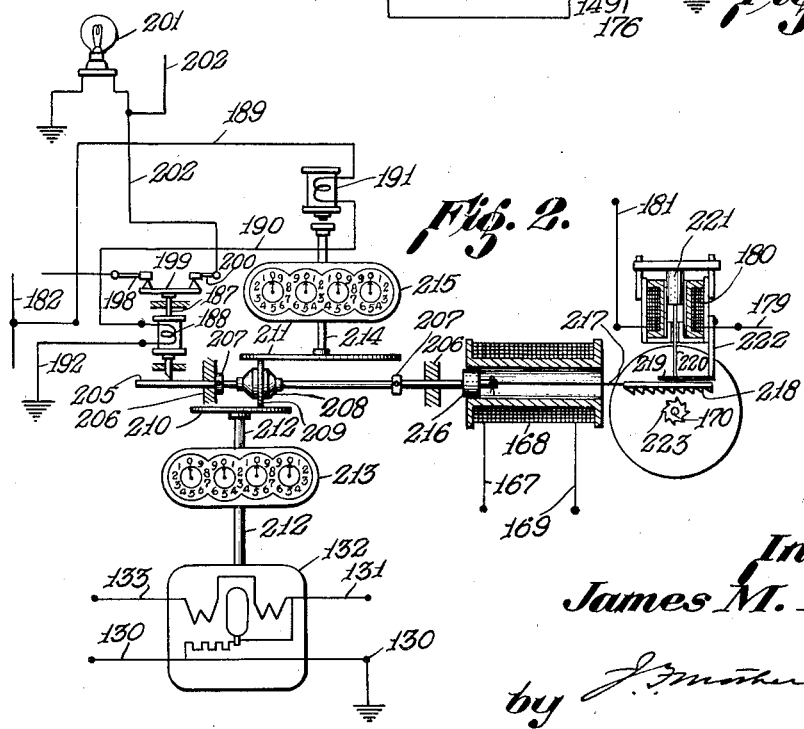
Fig. 2 is a detailed view partially in section of a part of a consumer's meter station showing one method and means for varying the drive ratio between the consumer's integrating meter and the discount meter.

The apparatus shown in Figs. 15, 16 and 17 is a modification of a part of the consumer's metering system shown in Figs. 1a, 1b, and 2. In this arrangement an ampere hour meter or kilowatt hour meter 132 is located on a power line pole outside of the building and controls the consumer's meter dials at a remote point via auxiliary conductors. In this case the meter on the pole preferably has a signal light that can be seen from the ground, for showing that the meter is operating properly.

In Fig. 15 the shaft 15a of the outside meter corresponds to the meter shaft 212 shown in Fig. 2. The meter shaft 15a through a worm gear arrangement turns the insulated gear wheel 15b upon which is mounted a segmental contacting face 15c. By the proper selection of the gearing the gear wheel 15b can be arranged to rotate once for every 50 or 100 watt hours, say, of energy passing through the outside meter, or once for a predetermined number of ampere hours of current, so that at each half revolution the contact 15c will pass under and metallically connect the brush contacts 15d and 15e, and later the brush contacts 15f and 15g. The apparatus just described and the signal lamp 15j are located in the outside meter box as shown on the pole in Fig. 17 at 132. Contacts 15d and 15f are connected together and to a source of electric potential at 15h such as wire 133 of Figs. 1a, 1b or 2. Contact 15g is connected via conductor 15h3 to one terminal of the signal light 15j. The other terminal of the signal light 15j is connected to the source of potential at 15h. Contact 15e is connected by way of auxiliary conductor 17a to the brush 17a1. The contact 15g is connected by conductor 17b to the brush 17b1. The brushes 17a1 and 17b1 are mounted on opposite sides of the motor shaft 16n so as to contact the partially complete circular slip rings 16b and 16j, respectively, carried on the disc 16a mounted on shaft 16n. Also carried on the disc 16a is a complete circular slip ring 16c which has a brush 16e bearing thereagainst. The brush 16e is connected by way of conductor 16f to one terminal of the motor 16g. The other terminal of the motor 16g is connected to ground at 16h. The slip ring 16c is connected via conductor 16d to the slip ring 16b and also via conductor 16k to the slip ring 16j.

Frictionally engaging with disc 16a are friction wheels 209 and 209a for driving the counting mechanism associated with the subscriber's discount meter and the subscriber's meter dials, respectively.

The operation of the system is as follows: the momentary closure of clock controlled contacts 5 energizes relay 40 which closes contacts 39 and 47 starting the rotation of the load analyser sensing motor 16 which rotates for one and only one revolution being energized from transformer 44 via the following circuit: wire 48, contacts 47 and 39, motor 16 to ground at 37. The above described circuit is only closed for a short time at the beginning of the rotation of motor 16, but prior to the opening of contacts 39 and 47 a circuit is completed by switch 20 immediately that the motor 16 moves the yoke 7 away from its normal position of rest (shown in dotted lines in Fig. 1).

The rotation of the motor 16 and the crank arm 14 mounted on its shaft 15 causes the crank pin 13 to move the yoke from its initial position to the position shown in solid lines and then backward to its starting position whereupon the motor stops. In the position of the yoke 7 (shown in full lines in Fig. 1) the projection or finger 18 on the yoke closes a circuit at switch 21—22 placing a potential on conductor 28 from wire 53. This potential causes a current to flow through the solenoids 26 and 30 in series to ground at 31. This flow of current energizes the solenoids 26 and 30 drawing down the sensing finger 24 and the zone plate contacting finger 32 into contact with their respective charts and zone plates. As the yoke 7 is carried to the right by the motor 16 the sensing finger 24 and the zone plate contacting finger 32 slide over their respective courses. When the sensing finger 24 comes to the edge of the insulating chart 4 and makes contact with the grounded metal platen 6, that one of the zone plates 33, 34, 35, etc., with which the zone plate contacting finger is now in contact is grounded, whereupon certain operations to be described hereinafter take place.

First it will be assumed, for the purposes of illustration, that the chart 4 has been turned by the clock 2 to such a position that the sensing finger 24 will leave the chart and contact with the platen 6 during the time that the zone plate contacting finger 32 is in contact with zone plate 33 and that switching unit 56'' was the last unit to be actuated.

With the application of ground potential to zone plate 33 (corresponding to an arbitrary discount rate of say, for example, 50%) current will flow to the grounded zone plate 33 via conductor 54 through the upper closed contacts 55 and 60 of the solenoid switch 56 (now in the unenergized locked up position) and thence over wire 68 through one of the windings of the two winding electromagnet 69, wire 71 to the upper winding 72 of solenoid having winding 72 and 80 and thence by conductor 74 to the tap 43 on transformer 44 and through the transformer to ground. Current flow in the above named circuit thereupon energizes the electromagnet 69 attracting its armatures 92, and 93 and energizes the solenoid winding 72, drawing down its armature shaft 73 to close certain circuits from contacts 122 and 123 to contacts 111 and 118, respectively. The energization of electromagnet 69 and the attraction of the armatures 92 and 93 effect the closing in of their respective contact arms against slip rings 95 and 96 and also closes through the intervention of the adjustable screw 91 passing through an insulated part of the arm, the normally open circuited holding switch 89—90, which when closed by the pressure of screw 91 establishes six operating circuits, which with their functions are described hereinafter.

Upon the actuation of switch shaft 73 by the energization of solenoid 72 electric potential from the transformer 44 is applied via the switch 73 and wire 49 to the primary of transformer 86 and the pulsing frequency generator driving motor 120. The closure of switch 73 also effects the application of potential to the pulser cycling motor 106 turning the shaft 105 carrying the pulsing drum 97 on which is mounted the pulser slip rings 95—96, etc., and commutator segments 98—99—100—101 etc. At the same instant the circuit is completed for the energization of the pulser cycling motor 106 via transformer 44, switch 73, conductor 110 to motor 106 and thence to ground, the transformer 86 is energized from the transformer 44 via switch 73 and conductor 119 whereupon current flows from the secondary 85 of transformer 86 via conductors 84 and 87 to energize electromagnet 51. The energization of electromagnet 51 attracts the armature 50 moving the pivoted contact arm 21 thus opening the circuit of the solenoids 26 and 30 at contact 22 allowing the sensing finger 24 and the zone late contacting finger 32 to be drawn upwardly by their respective springs (shown in Fig. 4) opening the circuit by means of which ground potential was applied to the zone plate 33 for the energization of one winding of the electromagnet 69 and the winding 72 of the solenoid for actuating switch 73. The opening of this circuit would permit the complete de-energization of electromagnet 69 and switch 73 were it not for the fact that each of these has two actuating windings the second of each of which have in the meantime become energized, as will be described presently.

With the energization of electromagnet 69 and the consequent closure of holding-in switch 89—90 a circuit was completed for the lower or second winding of the electromagnet 69 via the following circuit: secondary 85 of transformer 86, wire 87 to the lower winding of electromagnet 69 thence to the closed holding-in switch 89—90, wire 88, relay 82, and wires 83—84 back to the other terminal of the secondary 85 of transformer 86. Current flows in the circuit just traced immediately upon the energization of switch 73 and the energization of transformer 86 energizing relay 82. With the energization of relay 82 a circuit is provided from the secondary 85 of transformer 86, wires 84—83, armature of relay 82 to its engaged contact, wire 81, lower solenoid winding 80 of switch 73 and thence to the secondary 85 of transformer 86 via wire 87 energizing the winding 80 for holding the switch 73 closed even after the circuit of the upper solenoid 72 is open with the lifting of fingers 24 and 32.

With the closure of switch contacts 89—90 upon the initial energization of the transformer 86 a circuit is completed from the secondary 85 of transformer 86, wires 84, 83, winding of relay 82, wire 88, switch 89—90, wire 70 through the winding of the latch releasing electromagnet 58, wire 79, wire 87, to the other terminal of secondary 85 of transformer 86 thus energizing the latch releasing electromagnet 58 to attract the latch armature 57 unlatching the shaft 56 allowing it to drop, opening the contact between member 60 and contacts 55 and 62. It is the opening of this circuit which leaves the switching unit 56 inoperative until one of the other units (either switch unit 56' or 56'') has been operated at a subsequent closing of the clock controlled contacts 5. The dropping of the switch shaft 56 also closes the middle pair of contacts and the lowest pair of contacts associated with the switch shaft 56 to initiate an operation to be presently described.

As the switch shaft 56 drops the pivoted back contact 55 engaging the contact 60 on switch shaft 56 moves counter-clockwise to close a circuit at contact 63. The closure of the circuit at contacts 63 energizes the electromagnet 52 via the following circuit: tap 43 of transformer 44, wire 75, electromagnet 52, wire 76 to contacts 63, wire 54 connected to grounded zone plate 33. The closure of this circuit and the energization of electromagnet 52 with the attraction of its armature 50 causes the switch 21—22 to be opened in the event that it has not already been opened by the energization of electromagnet 51. The effect of the energization of electromagnet 52 when the electromagnet 51 has failed to open the circuit at switch contacts 21—22 will be dealt with hereinafter when the operation under different assumed conditions is described.

During the period of closure of switch 89—90 described above, a circuit is completed for relay 77 as follows: secondary 85 of transformer 86, wire 84, winding of relay 82, wire 88, switch 89—90, wire 70, winding of relay 77, wire 78, wires 79, 87 and back to the secondary 85 of transformer 86, causing relay 77 to be energized to open a point in the circuit of the lifting solenoid 59 associated with switch 56. Thus the solenoid 59 is inactive to lift the switch unit 56 so long as switch 89—90 is closed and relay 77 is energized.

The dropping of switch shaft 56 as heretofore described, and the closure of the middle contacts thereof completes a circuit for the solenoid 59'' as follows: secondary 85 of transformer 86, wire 84, winding of relay 82, switch 89—90, wire 70, contacts 64 and 65 of switch 56 through solenoid 59'' back contact of relay 77'', wire 78, wire 79 back to the secondary 85 of transformer 86. Solenoid 59'' thereupon energizes lifting the switch shaft 56'' (if it is down, and under the condition assumed above it will be down) and locking it in its uppermost position. From the drawing Fig. 1, it is obvious that switch shaft 56'' was the last operated by the load analyser because it is shown in unlatched downward position.

The dropping of switch shaft 56 also closes a circuit for the energization of solenoid 59' via the contacts 66—67 of switch 56 as follows: secondary 85 of transformer 86, wire 84, winding of relay 82, wire 88, switch 89—90, wire 70, contact 66 and 67 bridged by member 61 at switch shaft, solenoid 59, back contact of relay 77, wire 78, wire 79 to the opposite terminal of the secondary 85.

The energization of solenoid 59' by the completion of the circuit just described causes it to lift up the switch shaft 56' (if it happened to be down as shown in Fig. 1) whereupon the switch shaft is latched up by means of the latch 57' putting the unit in the receptive position for activation upon the application of ground potential to the adjustable zone plate 34 when next the load analyser sensing finger touches the metal platen 6 during the time the zone plate contacting finger is in contact with the zone plate 34. It is thus apparent that at any given time only one of the switch shafts 56, 56' and 56'' will remain unlatched and down because the initial dropping of any unit shaft always causes the lifting and latching of such of the others as are down.

The pulser cycling motor 106 and the pulser shaft 105 are set in motion by the closure of a circuit between contacts 122 and 111 by switch 73 as heretofore described. When the pulser cylinder 97 has turned slightly forward from its zero position the switch 113—114 held open in zero position of the cylinder by the insulated cam 115 will close by spring action to provide a circuit for the motor 106 upon the return of switch shaft 73 to its upper position. This circuit when completed extends from the ungrounded terminal 45 of transformer 44 through the upper contacts 121 and 117 of switch 73, conductor 116, switch 113—114, wire 112, to the motor 106 and thence to ground to insure the completion of one revolution of the pulser cylinder 97 and return it to its zero or normal position once it is started rotating. When the cam 115 gets back to its normal position at the completion of a revolution of the pulser cylinder it opens the switch 113—114 stopping the motor 106 leaving the pulser cylinder in its zero or normal position.

During the rotation of the pulser cylinder as initiated by the closure of switch 73 and with switch 89—90 closed as described above, arms 92 and 93, bear respectively upon the analyser slip rings 95 and 96 whereupon as the pulsing cylinder rotates the short commutator segments 98 and 100 come into engagement respectively with the brushes 102 and 103 to close a circuit between wires 125 and 126 by way of wire 125, brush 102, commutator segment 98, slip ring 95, contact 92, contact 93, slip ring 96, commutator segment 100, brush 103 to wire 126. The closure of this circuit completes the field circuit of the pulsing alternator 124 and effects the energization of the field windings of the pulsing alternator whereupon an alternating current of a predetermined frequency is sent out from the alternator via condensers 128 and 129 to the wires 130 and 131 of the distribution system. When commutator segments 98 and 100 leave the brushes 102 and 103 the field circuit of the pulsing alternator 124 is broken, thus ending the first or short pulse. As the pulsing cylinder continues its rotation commutator segments 99 and 101 come into engagement with the brushes 102 and 103 whereupon another pulse is transmitted. This second pulse has a length dependent upon the length of the segments 99 and 101 or upon the setting of the wedge shaped insulating cam 104, which may be set ahead of the end of the commutator segments 99 and 101, in which case the field circuit of the pulse alternator 124 is opened by the lifting of armature contact 92 away from slip ring 95. Simultaneously with the lifting of contact 92 the switch 89—90 is opened, whereupon the holding circuit of relay 69, the circuit of relay 82 and other circuits completed thereby are de-energized, thus completing a full cycle of operation of the load analyzer and pulser unit.

As the clock mechanism 2 again closes contact 5 after a predetermined interval it again initiates the operation of the load analyser as hereinbefore described. (It will be assumed that in this case there has been no change in the ordinate of the chart 4 since the last sending out of pulses.) In this case the zone plate contacting finger 24 will apply ground potential to the zone plate 33 the same as it did in the operation previously described, but in this case the application of ground potential to the zone plate 33 will not initiate the operation of the pulser for at this time the switch shaft 56 is in its downward position and the devices energized over the upper contacts thereof cannot now be energized thereby. The ground potential applied to zone plate 33 however causes a current to flow through electromagnet 52 via the following circuit: transformer tap 43, wire 75, electromagnet 52, wire 76, back contact 63, contact arm 55 and thence to grounded zone plate 33 via wire 54 to energize the electromagnet 52 attracting its armature 50 and opening the circuit, at switch 21—22, of the solenoids 26 and 30 holding the fingers 24 and 32, respectively, down, whereupon these fingers are raised by their respective springs to open the circuit and thereafter prevent the application of a ground potential to any of the zone plates 34 or 35 during the time that the yoke 7 is being returned to its normal position.

In the event that the ordinate of the chart 4 has been changed by the clock so that when the sensing finger 24 next senses this chart and applied ground potential to one of the zone plates 34 or 35, the operation of the relay system of the switching units 56' and 56'' would parallel that of switching unit 56 above described, so that when zone plate 34 is grounded switch shaft 56' is unlatched while the other switch shafts are drawn up and the middle commutator slip ring section on pulser shaft 105 controls the length of the pulses sent out from pulsing generator 124, it being understood that the respective slip ring commutator pulsing arrangements on the pulser drum 97 are effective to send out different lengths of pulses for setting different ratios of drive in the consumer's meter units to be described hereinafter.

The consumer's meter discount controlling impulses sent out under control of the load analyser by the high frequency pulsing generator 124, shown in Fig. 1 are transmitted over the wires 130 and 131, along with the electrical energy of the normal power frequency to a consumer's meter station such, for example, as that shown in Fig. 1a. At the consumer's meter station the integrating meter or watt-hour meter 132 (see Figs. 1a and 2 of the drawings) meters the energy coming from the plant via wires 130 and 131 and delivered to a load at wires 130 and 133.

When the first or short pulse of the two pulses sent from the central distributing system is received at the consumer's discount meter station (Fig. 1a) over the wires 130 and 131 and impressed upon the primary winding of transformer 134, a potential of the pulsing frequency as well as the normal power frequency exists across the secondary 136 of this transformer. However, inasmuch as the load circuit connected to the secondary 136 of this transformer is tuned to the pulsing frequency by means of the capacity 137 and the inductance 140 this secondary circuit admits practically no current at the normal power frequency but admits a maximum current (limited only by the ohmic resistance of the circuit) of the pulsing frequency. This pulsing frequency current is applied to a bridge rectifier at terminals 138 and 141, rectified current is derived from terminals 142 and 143 and sent to the unlatching electromagnet 144 and to the magnetizing coil 194 of the sensitive dynamic relay.

The first or short pulse unlatches the latching armature 145 from the latch flange on the solenoid shaft 146 of solenoid 147 permitting the said shaft to descend by gravity. This action takes place immediately upon the energization of electromagnet 144 heretofore described. When shaft 146 descends the switch contact plage 156 is carried with it to close circuits between contacts 153, 154, 155 and 156. The closure of a circuit between these contacts initiates a new cycle of operation at the consumer's discount meter station. Potential is applied to contacts 153 and 155 from the resistor 135 connected to one terminal of the primary of transformer 134 via conductor 160 and contact 154. The potential applied to contact 155 and conductor 182 thereupon energizes the motor 701. The potential applied to conductor 182 also causes the energization of electromagnets 188 and 191 via conductor 182, conductor 189, electromagnet 188, conductor 190, electromagnet 191 and thence to ground at 192.

The application of potential to contact 153 energizes the cycling motor 158 via the following circuit: contact 153, conductors 152 and 157, cycling motor 158, and thence to ground at 159. The cycling motor 158 thereupon starts driving low speed shaft 170 carrying disc 171 which rotates for a single revolution. Immediately that motor 158 has started and shaft 170, turned clockwise thereby, has moved from its initial or zero position contacts 162—163 are closed by spring action as the cam projection 172 on the disc 171 leaves spring contact 163. Closure of contacts 162—163 insures a driving circuit for motor 158 to drive the cam 172 for one revolution notwithstanding the fact that the initially closed circuit for energizing motor 158 is opened as hereinafter described prior to the completion of one revolution of shaft 170.

As the shaft 170 revolves the cam 173 pushes spring contact 165 to close a circuit between contacts 165 and 166 for energizing the meter clearing solenoid 168 via the following circuit: line connection through resistance 135, conductor 160, contacts 154, 156, 153, conductor 164, contacts 165, 166, conductor 167, winding of solenoid 168 and thence to ground at 169, whereupon the attached solenoid core 216 (see Fig. 2) is drawn to the right carrying with it the meter clearing shaft 205. During this stage of the operation the shaft is relatively free to move longitudinally due to the fact that the switch shaft associated with solenoid 188 and the friction driven disc 211 (see Fig. 2) are raised from contact therewith by the energization of solenoids 188 and 191, respectively, as hereinbefore described.

As the shaft 205 moves to the right the collar 207 comes to rest against the stop 206 placing the ratio determining friction wheel 209 at such a position that a one-to-one drive ratio is attained between friction discs 210 and 211. The friction wheel 209 is then in the position from which it is set by the ensuing discount determining impulse or the second impulse sent from the central station pulser.

Subsequent to the energization of solenoid 168 its circuit is interrupted at contacts 165—166 as the cam 173 passes over spring contact 165 as the motor 158 continues to drive shaft 170. When the shaft 170 has turned to such a position that the cam projection 175 carried thereby has left the roller mounted on contact spring 176 a circuit is closed from ground at 178, contact spring 176, contact 177, conductor 179, to the thruster actuating solenoid 180 preparing this solenoid for actuation upon receipt of the ratio setting or second impulse sent from the pulser at the central station.

Upon receipt of the second impulse the winding 194 of the dynamic relay (Fig. 1a, Fig. 6 and Fig. 7) is energized via the secondary of transformer 136 (Fig. 1a) condenser 137, rectifier 138, 143, conductor 195, winding 194, conductor 196, rectifier 142, 141, inductance 140, resistance 139 and back to the transformer 136. At the same time electromagnet 144 is energized, but without any effect, since the latch 145 has already been released. As the winding 194 is energized the eddy current disc 701 now being turned by the dynamic relay driving motor 700 (see Figs. 6 and 7) as above described, tends to carry the now magnetized pole pieces 702, magnetized by winding 194, with the disc until said pole pieces pivoted on pivot 703 move to such a position as to close a circuit at contacts 183—184. As long as this pulse continues contacts 183—184 remain closed. With the closure of these contacts a circuit is completed for the thruster solenoid 180 as follows: line connection through resistance 135, wire 160, contacts 154, 156, 155, conductor 182, contacts 183—184, contacts 186, 204, 203, of solenoid switch 187, conductor 181, solenoid 180, conductor 179, closed contacts 177—176 to ground 178, whereupon solenoid 180 energizes. With the energization of solenoid 180 the armature 221 (see Fig. 2) is drawn down, moving shaft 200 and spring 219 against the thruster rack 218 to move the rack into engagement with the spur gear or pinion 223 mounted on shaft 170 of motor 158. Since the motor 158 began its cycle of operation with the initial impulse sent from the pulser and since it is now turning, the thruster rack 218, is now urged to the left by the gear 223 and through the linkage member 217 connected between shaft 205 and rack 218 moves the shaft 205 and the ratio determining friction wheel 209 a distance proportional to the length of time contacts 183 and 184 are closed and thruster actuating solenoid 180 is energized. It is thus seen that a short ratio setting pulse moves the friction wheel 209 only a short distance while a longer pulse moves the wheel 209 a greater distance to provide a correspondingly decreased drive ratio between discs 210 and 211.

As the discount ratio determining pulse ends the magnetic flux induced in winding 194 and pole pieces 702 collapses and contact 183—184 open under the control of the spring on which contact 184 is mounted, whereupon the circuit for solenoid 180 is broken and the solenoid deenergizes and spring 219 raises shaft 220 and thruster rack 218 stopping the movement of shaft 205.

Subsequent to the stopping of shaft 205 and near the close of the cycle of operation of motor 158 the cam 174 carried by shaft 170 closes a circuit at contacts 149—150 energizing the resetting solenoid 147 via the following circuit: auto transformer tap 135, wire 160, closed contacts 162—163, wires 157, 151 closed contacts 150—149, solenoid 147 and thence to ground 148 whereupon solenoid 147 energizes and raises its armature shaft 146 to the position shown in the drawings (Fig. 1a) where it is locked by the spring latch 145. As the shaft 146 is raised the circuit for energizing the motor 700 of the dynamic relay and the solenoids 188 and 191 are open at contacts 155—156, whereupon these devices de-energize, the motor 700 stops running, the solenoid shaft 187 of solenoid 188 is free to descend provided shaft 205 (see Fig. 2) is not in its path and the friction disc 211 carried by the shaft 214 of solenoid 191 descends and causes the discount meter dial 215 to be driven by the disc 210 of the watt-hour meter 132 having a dial 213 through the intermediary of disc 210, friction wheel 209 and disc 211, to drive the discount meter dials 215 at some predetermined discount ratio with respect to the meter dials 213. This ratio, as pointed out hereinbefore, is determined by the length of the second pulse sent from the central or control station, which pulse length is in turn controlled by the load on the plant as determined at that instant or historically.

During the remaining part of the cycle of rotation of motor 158 the contacts 149—150 are opened, then contacts 176—177 are opened preparing the mechanism for the next cycle of operation and finally contacts 162—163 are opened. The opening of these contacts stops the motor 158 with the shaft 170 and associated cams in the position shown, completing one cycle of operation of the consumer's discount meter.

Following the setting of the consumer's discount meter as above described the energy used by the consumer is integrated by the conventional watt-hour meter 132 and registered on dials 213 while the discount meter dials 215 register a discounted number of units dependent upon the discount ratio setting of the friction wheel 209 as heretofore described.

This discount ratio setting of friction wheel 209 remains unchanged until the load analyser pulser mechanism at the central station (see Fig. 1) sends out another set of impulses to change that setting.

During such time as the ratio of drive between the disc 210 and disc 211 is any ratio other than one-to-one ratio the shaft 205 extends under the switch shaft 187 of solenoid 188 holding the contacts 198, 199, 200 closed. During such times as these contacts are closed a circuit is completed for the discount indicating signal lamp 201 as follows: conductor 131, conductor 197, contacts 198, 199, 200, and conductors 202, to the ungrounded terminal of one or more signal lights 201.

During such time as signal light 201 is on, the subscriber may then use any device that he wishes to operate during a discount period. In this case he closes the desired circuit manually. However, where such appliances as electric hot water heaters, air conditioning systems, attic ventilators, electrically operated deep well pumps, etc., are to be used a number of times each day, it is preferable to have automatic means such as disclosed in Fig. 8 for controlling the circuits therefor, in conjunction with the discount meter.

During the setting of the discount ratio at the consumer meter as described above, one or more consumer's off-peak load controllers (see Fig. 8) may be set to turn on and off certain devices used only during certain desired off-peak load periods under control of the pulse effecting the closure of contacts 183, 184 (Fig. 1A).

When contacts 183 and 184 in Fig. 1a or contacts 145 and 184' in Fig. 1b are closed and potential has been applied to conductor 181 as above described this potential is applied simultaneously to relay 821 via conductor 181 and to the motor 804 via conductor 181, conductor 809, closed contacts 810, contact arm 811, conductor 812 to the motor 804 grounded at 804B, whereupon the motor 804 starts running and relay 821 energizes.

Immediately that motor 804 begins rotation the cam 805 driven thereby is moved from engagement with contact arm 811 so that this arm moves downward under spring tension opening the circuit between contact 810 and the arm 811 for completing a circuit between contact 813 and the arm 811 so that current is now fed to the motor 804 from the auto transformer tap 814B on auto transformer 814 which became energized simultaneously with the movement of contact arm 811 at contact 815. During this phase of the operation of the system auto transformer 814 is energized from conductor 133 via conductor 816, and contacts 815. The motor 804 is then energized from auto transformer tap 814B via contact 813, contact arm 811, and conductor 812, thus the motor 804, once it starts rotating, will continue to be driven until it turns the cam 805 for one full revolution at which time this cam opens the motor circuit by moving the contact arm 811 away from contact 813. Since the impulses controlling the potential applied to the conductor 181 are always of less duration than the time required for cam 805 to make one revolution, it follows that the motor 804 will not be energized when contact arm 811 comes into engagement with contact 810 until the next succeeding operation of the system.

When the long dash or potential pulse is applied to conductor 181 as heretofore described, the solenoid relay 821 energizes and draws up the switch bar 821A. So long as the dash or pulse continues, depending upon the discount ratio to be applied, the relay 821 remains energized. When the pulse ceases, relay 821 de-energizes and the switch bar 821A descends. When the switch bar 821A is in the upper position a potential is applied to conductor 812C from the auto transformer 814 via switch bar 821A, conductor 812, contact arm 811, contact 813 and tap 814B.

When the switch bar 821A returns to its lower or normal position at the end of the dash or pulse, a circuit is closed between the contact 826 and the auto transformer tap 814B via the switch bar 821A, conductor 812, contact arm 811, contact 813 and thence to the auto transformer tap 814B. This latter traced circuit remains closed until the circuit of the cycling motor 804 is interrupted at contacts 811, 813 as heretofore described.

During the rotation of the cyling motor 804 and the cam disc 808 driven thereby, the conductive tongues 806 and 806a (see Fig. 9) are rotated one revolution. During the first part of the revolution of the cam disc 808 the conductive tongue 806 is brought into bridging engagement between contacts 812C and 822B connecting these contacts electrically. At this same time tongue 806a is brought into bridging engagement between contacts 812B and 822C connecting these contacts electrically. During this phase of the rotation of the cycling motor 804 either contact 812B or contact 812C has a potential applied thereto, depending upon the position of the bridging contact 821A carried by the armature of solenoid 821 as previously described.

First it will be assumed that the discount determining dash or pulse still persists and that relay 812C is still energized when tongue 806 bridges contacts 812C and 822B, in which case potential will be applied to contact 819 and from thence to electromagnet 824 and to ground, thus energizing the electromagnet 824 causing it to move the armature 824A to the position shown in the drawings and applying a potential to the conductor 822 associated with the first discount lamp via plug or switch 831. If the plug or switch 831 has previously been moved to such a position as to complete a circuit from the first discount lamp and from conductor 831C to conductor 822 then the electromagnet 832 and the first discount lamp are energized, upon the closure of the circuit at armature 824A. The energization of electromagnet 832 effects the closure of a circuit for device 834 at contacts 932A, which will remain closed as long as a discount is applied.

In the event the selector switch 831 is closed instead from conductor 830 to the second discount lamp then the electromagnet 832 and device 834 would not be energized except at such times as armature 827A is closed by the electromagnet 827 against the contact connected to conductor 830.

This would only occur when the discount determining pulse applied to conductor 181 was of sufficient length to maintain the electromagnet 821 closed until the tongues 806 and 806a on disc 808 reached to the second set of contacts 826 corresponding to a longer discount period.

As Fig. 8 is drawn (showing the solenoid switch 821, in the down position) when the pulser wire 809 is activated, with the first or short dash of a signal, the motor 804 will begin to rotate its central shaft as described, and at the same time the solenoid 821 will be activated and will lift up its contact bar 821a thus connecting the upper right hand contact, to which the live motor wire 812a is connected to the opposite contact 812b, and thence over the wire 812c, to the similar four-contact clips 822 and 826, one of which (assumed to be 822) is shown in sectional detail, Fig. 9.

At the end of the short dash pulse the solenoid switch 821 is de-energized and its armature with the contact bar 821a falls to the lower contacts, thus energizing from the live motor wire 812 across the lower switch contacts the wire 812b and de-energizing the wire, 812c, but as the two switch clips 806 and 806a are mounted on the rotating insulated disc 808 in such a circumferential position with reference to the starting point that they will not have entered the switch clips 822 during the time in which the short dash prevails nor during the added time in which the space following the short dash prevails, so no electric contact effect would be produced through the agency of the clips 822 or 826 during the combined time period of the short dash and the following non-pulse interval, but as the four-contact clips 822 and 826 are adjustable circumferentially with reference to the axis of rotation of the switch clips, 806 and 806a the first set (822) of the four-contact clips may be adjusted so that the switch clips 806, 806a will enter them immediately after the added time periods of the short pulser dash and the following non-pulse interval and so will establish connection from the activated (due to the then-prevailing long dash) wire; 812c, by the switch clips 806 (Fig. 9) the live (pulse-dash) wire 812c, which is connected to the wire 822b that leads through (and so activates) to the electromagnet 824, to the ground connection 831.

The activation of the electromagnet 824 causes the right end of the pivoted armature 824a to rise and its opposite end to fall and close the circuit from the permanently live wire 817, through the wire 825 to the contact point 825a, of the manually operated contactor switch 831 (Fig. 8, left side). When the switch handle 831a is directly over the contact 825, and the central sliding contact bar 831b will activate the wire 831c running from the contact bar to the meter relay coil 832, and thence through the winding of the coil to the ground will lift the relay armature, 832a, and thus close the motor circuit from the live wires 833 and 833a, to cause the motor 834 to run. The armature 824a will be held by its unbalanced tipping-weight 824b, against the contact 825, until such time as the magnet 823 is magnetized instead of the magnet 824, at which time the armature 824a will rise to the electromagnet 823, opening the circuit through the wire 825 and holding it open because of the tip weight 824, leaning to the right when the lefthand end of the armature 824a is pulled up.

The lefthand electromagnet 823 will be energized when and only when, during a single cycle of operation, no long dash pulse comes in over the pulse wire 809. The second four-contact clip unit 826 operates in the same way as unit 822 when the long pulse persists long enough in time to hold up the solenoid switch armature 821c until the turning switch clips 806, 806a are within and in contact with the clips 826.

The wires 817, 825 and 830 as a group and controlled as described above may operate many such manually operated contactors as 831, each controlling its own load, its discount signal lamps showing by being lighted what discount is prevailing so that the consumer may decide what discount he chooses to operate at or to shut the load down by moving the controller to the "control off" position, or by setting the control handle at the "zero" discount position take all zones of discount as they come—the system being such that the consumer gets the best discount always when his load is connected—regardless of where his control handle is placed, the important function of the control handle being to permit the consumer to determine the minimum zone of discount which shall be acceptable to him for the particular load unit being controlled.

The operation of the consumer's discount meter, shown in Fig. 1b, is substantially the same as that heretofore described in connection with Fig. 1a, except that in Fig. 1b the relay 144' performs the combined functions performed in Fig. 1a by the electromagnet 144 and the dynamic relay closing contacts 183 and 184. In this arrangement the first dash or pulse received unlatches the latch 145 the same as in Fig. 1. However, with the beginning of the second pulse this relay 144' is effective as a relay closing a circuit from contact 184' to the armature or latch 145 for controlling the energization of the thrustor controlling solenoid 180 as described in connection with Fig. 1a.

The operation of the system shown in Figs. 10 and 11 is substantially the same as that heretofore described in connection with Figs. 1 and 3 in which the system of Figs. 10 and 11 is a modification.

In Figs. 10 and 11 the sensing finger 24 senses the spiral chart 1004 carried on the shaft 1003 of a wattmeter or ammeter measuring the entire power or current generated by the plant or system with which the discount metering system is used. In this case as the wattmeter or ammeter shaft 1003 is rotated responsive to changes in load the spiral chart 1004 is moved so that its radius in the direction of movement of the sensing finger 24 is a measure of the total plant load as measured in watts, or amperes or in the percentage of utilization of the total plant facilities.

During such times as the sensing finger 24 in Figs. 10 and 11 is drawn down for sensing the radial width of the chart 1004 the electromagnet 1005 connected in series therewith is energized to lock shaft 1003 against movement while the chart is being sensed.

In other respects the operation of the system shown in Figs. 10 and 11 is identical with that of Fig. 1 where the circuits are shown in their entirety and in which the like numbered parts are identical.

The operation of the system shown in Figs. 15, 16 and 17, is best understood when these figures are considered in connection with Figs. 1a, 1b and 2, wherein the showing of Figs. 15, 16 and 17 represents a modification of those systems. The shaft 15a in Fig. 15 is a revolving shaft of a watthour meter or ampere hour meter similar to the shaft 212 in Fig. 2, but instead of driving the meter dials such as dials 213 and 215 as in Fig. 2, a gear 15b is driven thereby to effect the alternate closing of circuits between contacts 15d and 15e and then contacts 15f and 15g. Each time a circuit is closed between contacts 15d and 15e at the meter 132 shown on the pole in Fig. 17, a circuit is closed for the motor 16g located at a remote point to cause this motor to drive the disc 16a one half of a revolution, by way of the following circuit: source of potential 15h (such as wire 131 or 133 in Fig. 2), conductor 15h1, contacts 15d—15c, 15e, conductor 17a, brush 17a1, incomplete slip ring 16b, connection 16d, slip ring 16c, brush 16e, conductor 16f to the motor 16g grounded at 16h. Upon completion of the above traced circuit, the motor 16g revolves turning disc 16a one half revolution or until the incomplete slip ring 16b leaves the brush 17a1 opening the motor circuit. As the shaft 15a turns further a circuit is ultimately made between contacts 15f and 15g by way of contact 15c whereupon the motor 16g once more turns the disc 16a a half revolution via the following circuit: source of potential 15h, contacts 15f, 15c, 15g, conductor 17b, brush 17b1, incomplete slip ring 16j, connection 16k, slip ring 16c, brush 16e, conductor 16f to the motor 16g, whereupon the motor 16g revolves driving the disc 16a for a half revolution or until the circuit is opened at brush 17b1 when the cutout or incomplete portion of slip ring 16j comes opposite thereto. It is thus evident that each time the shaft 15a makes a half revolution the disc 16a likewise makes a half revolution. The disc 16a when turning drives the integrating meter dials 16m through the friction disc 209A and the discount meter dials through the friction disc or wheel 209 which is set to apply the appropriate discount by the means shown in Figs. 1a, 1b and 2.

The turning of shaft 15a in Fig. 15 causes the lamp 15j to be lighted each time contact 15c bridges contacts 15f and 15g to indicate that the meter driving shaft 15a is operating. This lamp is preferably placed in such a position that line attendants can by the flashing thereof check the operation of the meter.

It will be obvious that this invention is not limited to the means shown and that equivalent means may be employed without departing from the spirit of the invention. For instance, in Fig. 1 a unidirectional motor 16 is shown for traversing the sensing and zone plate contacting fingers from right to left and then back to the right again, but obviously a reversible motor carrying a pinion may be used to drive a rack first in one direction and then reversed to drive the rack in the opposite direction. Likewise, throughout the system a separate source of direct current potential or A. C. may be used to actuate the several relays, solenoids, and electromagnets. Similarly, in place of the non-conducting charts 4, grounded metallic charts may be used in which case appropriate changes could be made in the zone plate electromagnet system.

The automatic turning on or off of devices could be controlled directly or indirectly by the position of shaft 205 in Fig. 2, rather than by the means shown in Fig. 8.

The meter shaft 15a in Fig. 15 could be used to drive an apertured disc or shutter between a light source and a photoelectric cell thus periodically interrupting the light from such source to said cell for generating impulses and these impulses could be used to remotely energize an electromagnetically actuated ratchet on pawl mechanism for driving the disc 16a. Ampere meters and ampere-hour meters may be substituted for wattmeters and watt-hour meters especially where the voltage of the system is accurately maintained. Where multiphase power systems are employed, separate measuring instruments can be used for each phase and the displacements or torques of the several phases combined or added.

Instead of automatically setting the varying discounts in accordance with actual load conditions or the historically established probable loads, it may be desirable occasionally to set all of the consumers' meters to some particular discount or to no discount where plant repairs demand it. This can be done by initiating the sending of impulses by manually closing contacts 5 and manually grounding the zone plate corresponding to the particular discount desired.

Other and further modifications of the invention may be made within the scope of the appended claims.

I claim:

1. An electrical metering system for metering the electricity supplied to a consumer and for providing a discounted reading of a lesser number of units thereof used during off-peak load periods than for the same quantity when used in peak load periods, comprising a watt hour meter connected so as to record the actual number of watt hours of energy used, means driven from said watt hour meter for recording a discounted number of units dependent upon the ratio of drive therebetween, and means responsive to the percentage of utilization of the available plant capacity of the plant supplying said consumer for setting the drive ratio between said watt hour meter and said discount meter as a function thereof.

2. In an electrical metering system, the method of applying off peak load period discounts which comprises continuously metering the electricity used at a consumer station and indicating the total used at said station as an amount less than that actually metered at such times as the plant supplying said station is operating at a predetermined percentage of the available load capacity.

3. In an electrical metering system in which electricity is metered in an integrating meter and discounts are applied to the meter reading for electricity used during periods in which the plant is operating at a reduced percentage of the available plant capacity, a discount controlling pulser comprising a clock mechanism for periodically closing a circuit, means controlled by the periodic closing of said circuit for sensing a variable width segment the width of which varies in accordance with the percentage of the available plant capacity being utilized, means responsive to the width of a particular segment sensed for initiating the sending of electrical control impulses having a length dependent upon the length of a segment sensed, and non-repetitive means for disabling the sending of further impulses except at such times as there has been a change in the width of the segment senses.

4. In an electrical metering system a meter for metering the electricity consumed at a subscriber station, a discount meter for indicating a discounted reading of the electricity actually consumed, said discount meter being driven from said first meter, and remote control means for setting the discount ratio of drive between said meters.

5. A system in accordance with claim 4 in which the remote control means is actuated periodically to change the discount ratio setting at a subscriber station responsive to the percentage of utilization of the plant supplying electricity to said meter.

6. A system in accordance with claim 4 in which the remote control means is actuated periodically to change the discount ratio setting at a subscriber station in accordance with the ratio of the current actually supplied by said plant to the maximum available therefrom.

7. A system in accordance with claim 4 in which the remote control means is actuated periodically to change the discount ratio setting at a subscriber station responsive to the historically established probable percentage of utilization of the plant supplying electricity to said meter.

8. A system in accordance with claim 4 in which said remote control means for setting the discount ratio of drive between said meters includes means for periodically transmitting electrical impulses of a fraquency different from the power frequency over the lines supplying power to said meter for setting the said ratio.

9. In an electrical metering system a meter for metering the electricity consumed at a subscriber station, a discount meter for indicating a discounted reading of the electricity actually consumed, said discount meter being controlled from said first meter, and means located at the central station supplying said subscriber station for periodically transmitting control impulses of a frequency different from that of the power frequency to the subscriber station for setting the ratio of drive between said meters, said means including means for determining the ratio to be applied and means for transmitting an electrical impulse of a length corresponding to the ratio to be set, and means at said subscriber station responsive to said variable length impulses for setting variable discount ratios in accordance therewith.

10. An automatic pulse transmitter comprising clock control means for instituting the transmission of control impulses at predetermined intervals, means for determining the length of pulse to be transmitted, and means for transmitting a pulse having a length corresponding to that determined by said last mentioned means, and means for disabling said last mentioned means when the pulse length to be transmitted corresponds to the pulse length transmitted during the last period said means was operated to transmit pulses.

11. A system in accordance with claim 10 in which the pulses are transmitted at a frequency different from the power frequency employed on an electrical transmission system over the lines of said system to an electrical metering device at a subscriber station in combination with means at said subscriber station responsive to said impulses for setting the ratio of drive between an integrating meter and a discount meter located at said subscriber station for integrating the electricity used by said subscriber.

12. A system for automatically turning on and off electrical devices at a consumer's station responsive to the percentage of utilization of the available plant capacity of the plant supplying said system comprising means for transmitting signals to the subscriber station periodically, means for controlling a characteristic of said signals to indicate the percentage of plant utilization and means at said consumer station responsive to signals corresponding to a low percentage of plant utilization for turning on certain electrical devices and responsive to the signals corresponding to peak loads on said plant for turning off said electrical devices.

13. A system in accordance with claim 12 in which said signals comprise electrical pulses of a frequency different from the power frequency and in which pulses of varying length are utilized to indicate varying plant facility utilization conditions.

14. A system in accordance with claim 12 including means for rendering the signal transmission means ineffective to transmit a controlling signal when the signal to be transmitted during that period is identical with the last signal transmitted.

15. A system in accordance with claim 12 in which the signals transmitted are determined by the load on said system.

16. An electrical metering and switching system comprising means located at a subscriber's station for indicating a discounted reading of the electricity actually used during off peak load periods of the plant supplying said subscriber station, and means for switching on electricity utilizing devices during such times as the plant is operating at non-peak loads, said means for providing a discounted reading of the electricity actually used and said means for turning on and off electrical devices both being actuated by the same electrical impulses transmitted from the central station supplying said subscriber station.

17. An electrical metering system comprising a shaft adapted to rotate as a measure of the electricity used, counting dials remotely situated with respect to said shaft, a motor for driving said counting dials, means responsive to the rotation of said shaft for energizing said motor, and means responsive to the percentage of utilization of the available plant capacity of the plant supplying said system for setting the drive ratio between said motor and said counting dials.

18. A system as set forth in claim 17 including a signal lamp and means for energizing said lamp periodically responsive to rotation of said shaft.

19. A system as set forth in claim 17 including two sets of counting dials at least one of which is driven from said motor at a predetermined fixed driving ratio.

20. In an electrical metering system in which the counting dials are remotely located with respect to a rotating shaft rotating in accordance with the load on said system, the method of driving said counting dials which comprises electrically follow-up driving said metering dials, and varying the drive ratio between said rotating shaft and said counting dials as a function of the percentage of utilization of the available plant capacity of the plant supplying said system.

21. A system in accordance with claim 1 in which the watt hour meter dials and the discount meter dials are actuated via remote control from a rotating shaft rotating in accordance with the load being measured.

22. An electrical metering system in accordance with claim 3 in which the width of the variable width segment is controlled as a function of the total current supplied by the system.

23. A system in accordance with claim 4, including a remote control linkage between the meter proper and the indicating dials, said linkage comprising a follow up mechanism for rotating the dials of said meters responsive to the rotation of the meter proper.

24. A system in accordance with claim 9 including means for automatically turning on and off electrical devices responsive to a change of the discount rates applied.

25. A system in accordance with claim 12 including means at a consumer station for applying variable discounts to the meter readings of the electrical meter thereat proportional to the number of devices at said station turned on.

JAMES M. BOYLE.